Sept. 20, 1949.   I. S. RITTER ET AL   2,482,735
AIR HEATING SYSTEM
Filed June 4, 1947

INVENTORS
IRVING S. RITTER +
FRANK W. MORLEY
BY Robert J. Palmer
Attorney

Patented Sept. 20, 1949

2,482,735

UNITED STATES PATENT OFFICE 2,482,735

AIR-HEATING SYSTEM

Irving S. Ritter, Sharon, and Frank W. Morley, Westwood, Mass., assignors to Westinghouse Electric Corporation, East Pittsburgh, Pa., a corporation of Pennsylvania Application June 4, 1947, Serial No. 752,340

4 Claims. (Cl. 237—5)

This invention relates to air heating systems, and relates more particularly to air heating systems for railway passenger cars having liquid cooled, internal combustion engines thereon for driving electric generators, and utilizing heat extracted in cooling the engines for heating the passenger space.

On railway passenger cars having air conditioning systems, the electric load for energizing the refrigerant compressors and other air conditioning apparatus, the car lights, and the auxiliaries used on the cars, is so great that many railroads prefer to use internal combustion engines such as Diesel engines, for driving the electric generators, instead of axle generators, thereby removing the electric load from the train locomotives.

The heat extracted from the water circulated through the jackets of such engines, has been used in the past for heating the passenger spaces in cold weather, and this invention is an improvement on such prior systems.

A feature of this invention is that all of the heat in the jacket water is available for heating the passenger space before being dissipated in the engine radiator.

Another feature of this invention is that the air heating pipes in the passenger space, in which the engine jacket water is circulated, contain inner pipes connected to a steam supply for supplying auxiliary heat when the heat in the jacket water is insufficient for properly heating the passenger space.

Another feature of this invention is that controls are provided for preventing the engine from coming up to speed before it is properly warmed up, and for maintaining the engine at an efficient operating temperature.

An object of the invention is to use heat extracted from the liquid used to cool an internal combustion engine, for heating air efficiently and without affecting the performance of the engine.

Another object of the invention is to use the jacket water of a water cooled, internal combustion engine for heating air, and to use steam for heating the jacket water when the heat extracted from the engine is insufficient.

Figure 1:
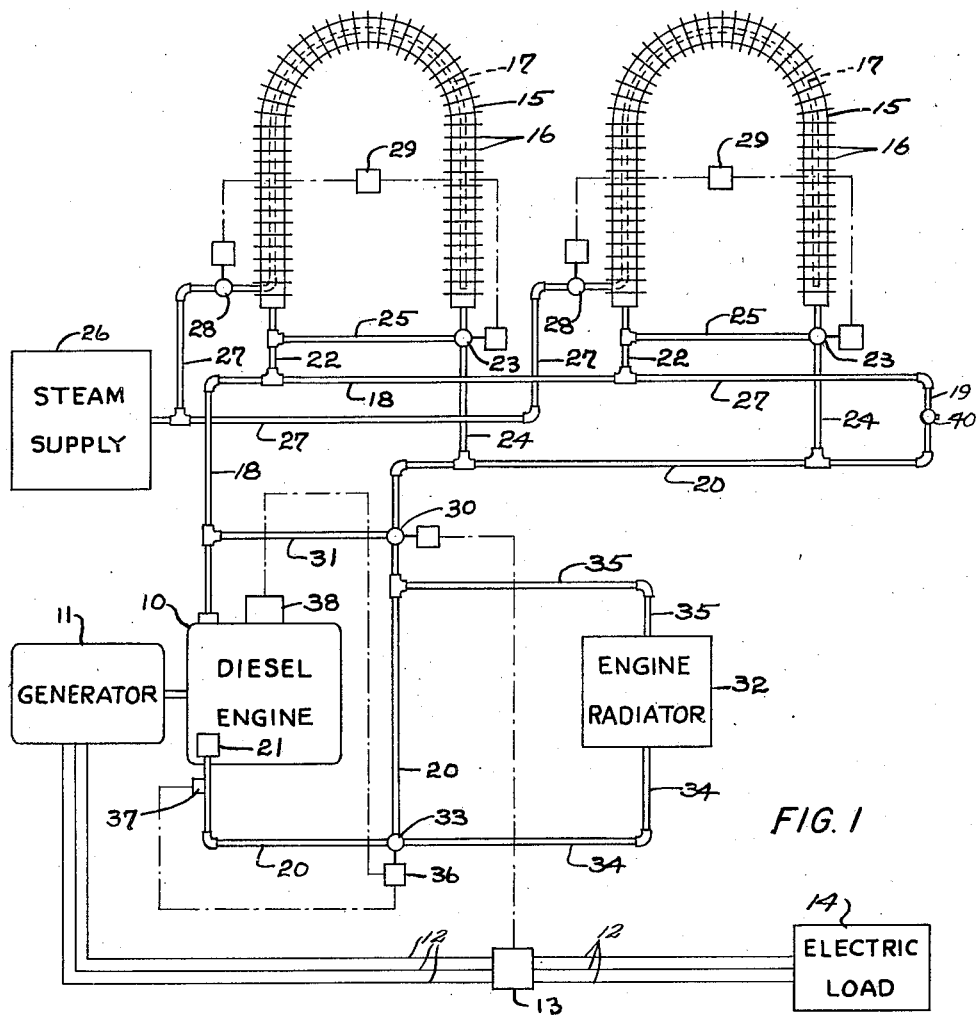
Figure 2:
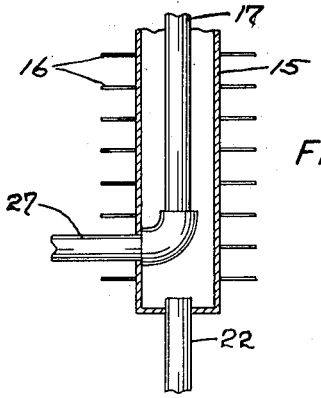

The invention will now be described with reference to the drawing of which Fig. 1 is a diagrammatic view of one embodiment of this invention as used for heating the passenger space of a railway passenger car, and Fig. 2 is an enlarged fractional view of one of the air heating pipes used.

The engine 10 drives the generator 11 which supplies electric power through the wiring 12 and the switch 13 to the electric load 14. The load 14 may include the motors driving one or more refrigerant compressors, the motors driving fans and other equipment of an air conditioning system and the electric lights.

In the embodiment of the invention illustrated, the car has the two similar, floor heating pipes 15 for heating two separate zones of the car. Each pipe 15 has the extended surface fins 16 thereon, and contains the steam pipe 17.

The water outlet of the engine 10 is connected to the water supply piping 18 which in turn, is connected by the pipe 19 to the water return piping 20 which is connected to the inlet of the pump 21 of the engine. The piping 18, 19 and 20 would be under the floor of the car. The pipe 19 contains the conventional pressure regulating valve 40.

The water inlets of the pipes 15 are connected by the pipes 22 to the piping 18, and their outlets are connected through the valves 23 and the pipes 24 to the piping 20. The by-pass pipes 25 are connected to the pipes 22 and the valves 23.

The steam supply source 26 which may be a steam locomotive or a flash boiler on an electric or Diesel locomotive, supplies steam under pressure through the piping 27 and the valves 28 to the steam pipes 17 in the air heating pipes 15. The ends of the pipes 17 opposite the ends connected to the valves 28 are closed. The condensate is drained from the pipes 17 through the usual traps which are not illustrated.

The zone thermostats 29 in the passenger space control the water valves 23 and the steam valves 28, and preferably would act first to close the by-pass pipes 25 on a fall in temperature, and then to open the steam valves if the temperature is not restored.

The valves 23 are three-way valves and can be adjusted by the thermostats 29 to permit water to circulate through the pipes 15 or to by-pass the water through the pipes 25 around the pipes 15. The valves 23 preferably modulating valves whereby they may be adjusted to permit some water to flow through the pipes 15 while by-passing some water through the pipes 25, thus affecting close temperature control.

The water return piping 20 has the three-way valve 30 therein and which is connected by the by-pass pipe 31 to the water supply piping 18 adjacent the water outlet of the engine. The valve 30 is controlled by the switch 13, and acts when the engine is first started and is therefore cold, to by-pass all of the water from the engine through the pipe 31 around the heaters 15, until the engine is fully warmed up as will be described.

The three-way valve 33 is located in the water return piping 20 between the valve 30 and the pump 21, and is connected by the piping 34 to one side of the engine radiator 32, the other side of which is connected by the piping 35 to the piping 20 at a point between the valves 30 and 33, the portion of the piping 20 between the pipes 34 and 35 acting as a by-pass around the radiator 32 when the valve 33 is adjusted to close the pipe 34 as will be described.

The control motor 36 of the valve 33 is connected to the bulb 37 which responds to the temperature of the water entering the pump 21, and is connected to the throttle 38 of the engine 10. The motor 36 acts to fully open the throttle of the engine when the water entering the engine is at the proper operating temperature after the warm-up period as will be described. The motor 36 also adjusts the valve 33 to permit water from the piping 20 to pass through the radiator 32 when the water entering the engine is at its proper operating temperature as will be described.

In operation, assuming the engine 10 has just been started and is relatively cold, it will idle while the valve 30 will act to by-pass the water from the engine through the pipe 31 around the air heating pipes 15. At this time the bulb 37 will have caused the valve 33 to close off the flow of water through the radiator 32. The engine will therefore, warm-up quickly since all of its jacket water is recirculated directly through the engine jackets.

When the water reaching the pump 21 reaches the proper operating temperature which may be 160° F., the bulb 37 will cause the motor 36 to adjust the valve 33 to permit water to flow through the radiator 32. The valve 33 may be a modulating valve for adjusting the water flowing through the radiator and bypassing same. At the same time the motor 36 will adjust the throttle 38 to wide open position, at which position the engine will operate at its rated speed.

When the engine has come up to speed, the conventional voltage responsive switch 13 will close connecting the electric load 14 to the generator 11. At the same time the switch 13 will adjust the valve 30 to close the by-pass pipe 31 around the floor heating pipes 15, so as to permit water from the engine to flow through the pipes 15.

As may be observed, the water from the engine is prevented from flowing through the heating pipes 15 until the engine is fully warmed up, following which the jacket water passes through the air heating pipes 15 before it is permitted to pass through the radiator 32 so that the pipes 15 have first chance at extracting heat from the jacket water. If after passing through the pipes 15, the jacket water needs additional cooling, the bulb 37 will act to adjust the valve 33 to permit the jacket water to flow through the radiator.

The zone thermostats 29 will regulate the volume of the jacket water flowing through the heating pipes 15 for maintaining the desired temperature in the passenger space, which temperature may be 70° F. If the car temperature continues to fall after the thermostats 29 have adjusted the valves 23 to completely close the by-pass pipes 25, the thermostats will then act to open the valves 28 to permit sufficient steam from the source 26 to enter the pipes 17 so as to heat the jacket water sufficiently for restoring the desired temperature. The conventional regulating pressure valve 40 connected in the pipe 19, acts to maintain such resistance to water flow in the pipe 19 that there is less resistance through the pipes 15 to the water flow, thereby preventing the water being by-passed around the pipes 15.

While one embodiment of the invention has been described for the purpose of illustration, it should be understood that the invention is not limited to the exact apparatus and arrangement of apparatus illustrated, as modifications thereof may be suggested by those skilled in the art, without departure from the essence of the invention.

What is claimed is:

1. An air heating system for using heat from the jacket cooling liquid of a liquid cooled, internal combustion engine, comprising liquid supply piping connected to the cooling liquid outlet of the engine, liquid return piping connected to the cooling liquid inlet of the engine, an air heating pipe connected at one end to said supply piping, and connected at its other end to said return piping, a by-pass pipe connected between the ends of said air heating pipe, a valve in said by-pass pipe for regulating the flow of liquid therethrough, an engine radiator, piping so connecting said radiator to a portion of said return piping that said portion forms a by-pass around said radiator, a valve in said portion for adjusting the volume of liquid by-passed around the radiator, a by-pass pipe connected to said supply piping between the engine and said air heating pipe, and connected to said return piping between the air heating pipe and the radiator, a valve in said last mentioned by-pass pipe for opening and closing same, and means for adjusting said last mentioned valve to open said by-pass pipe at low engine speeds, and to close said by-pass pipe at high engine speeds.

2. An air heating system for using heat from the jacket cooling liquid of a liquid cooled, internal combustion engine having a speed adjusting throttle, comprising liquid supply piping connected to the cooling liquid outlet of the engine, liquid return piping connected to the cooling liquid inlet of the engine, an air heating pipe connected at one end to said supply piping, and at its other end to said return piping, a by-pass pipe connected between the ends of said heating pipe, a valve in said by-pass pipe for regulating the flow of liquid therethrough, thermostatic means responsive to the temperature in the space to be heated for adjusting said valve, an engine radiator, piping so connecting said radiator to said return piping that a portion thereof forms a by-pass around the radiator, a valve in said portion for adjusting the volume of liquid by-passed around the radiator, means responsive to the temperature of the liquid at the engine for adjusting said last mentioned valve towards closed position, and for advancing said throttle when the temperature of the cooling liquid increases to the engine operating temperature, a by-pass pipe connected to said supply piping between the engine and said air heating pipe, and connected to said return piping between the air heating pipe and the radiator, a valve in said last mentioned by-pass pipe for opening and closing same, and means actuated when the engine reaches operating speed for adjusting said last mentioned valve to close said last mentioned by-pass pipe.

3. An air heating system for using heat from the jacket cooling liquid of a liquid cooled, internal combustion engine, comprising liquid supply piping connected to the cooling liquid outlet of the engine, liquid return piping connected to the cooling liquid inlet of the engine, an air heating pipe, means including a valve connecting said air heating pipe to said supply and return piping, a steam supply source, a steam pipe in said air heating pipe, means including a valve connecting said steam pipe to said steam supply source, and thermostatic means responsive to the temperature of the space to be heated for adjusting said valves.

4. An air heating system as claimed in claim 3 in which the thermostatic means acts upon a reduction in the temperature in the space to be heated, first to open the first mentioned valve, and then to open the second mentioned valve when after the first mentioned valve has been opened, the temperature in the space continues to fall.

IRVING S. RITTER.
FRANK W. MORLEY.

REFERENCES CITED

The following references are of record in the file of this patent:

UNITED STATES PATENTS

| Number | Name | Date |
| --- | --- | --- |
| 508,132 | Gold | Nov. 7, 1893 |
| 2,279,037 | Endsley | Apr. 7, 1942 |
| 2,332,149 | Horton | Oct. 19, 1943 |
| 2,346,590 | La Rocque et al. | Apr. 11, 1944 |